United States Patent [19]

Zecher et al.

[11] Patent Number: 4,548,970

[45] Date of Patent: Oct. 22, 1985

[54] POLYAMIDEIMIDES PREPARED BY REACTING EITHER LACTAMS OR POLYAMIDES WITH POLYISOCYANATES AND ANHYDRIDES USING A LACTAM AS AN ADDITIVE

[75] Inventors: Wilfried Zecher, Leverkusen; Rolf Dhein, Krefeld; Klaus Reinking, Wermelskirchen, all of Fed. Rep. of Germany

[73] Assignee: Bayer Aktiengesellschaft, Leverkusen, Fed. Rep. of Germany

[21] Appl. No.: 644,708

[22] Filed: Aug. 27, 1984

[30] Foreign Application Priority Data

Sep. 6, 1983 [DE] Fed. Rep. of Germany ....... 3332033

[51] Int. Cl.4 ............................................. C08L 79/08
[52] U.S. Cl. ...................................... 524/98; 524/99; 524/718
[58] Field of Search ............................ 524/98, 99, 718

[56] References Cited

U.S. PATENT DOCUMENTS 3,658,773  4/1972  Zecher et al. ......................... 528/48
3,752,791  8/1973  Zecher et al. ....................... 524/742

*Primary Examiner*—Maurice J. Welsh
*Attorney, Agent, or Firm*—Connolly and Hutz

[57] ABSTRACT

This invention relates to new polyamide imides and to the use thereof as thermoplasts.

5 Claims, No Drawings

POLYAMIDEIMIDES PREPARED BY REACTING EITHER LACTAMS OR POLYAMIDES WITH POLYISOCYANATES AND ANHYDRIDES USING A LACTAM AS AN ADDITIVE

This invention relates to new polyamide imides and to the use thereof as thermoplasts.

It is known that aliphatic-aromatic polyamide imides may be obtained by reacting polyisocyanates with cyclic polycarboxylic acid anhydrides and lactams (DAS No. 17 70 202) or polyamides (DAS No. 19 56 512). The reaction products are distinguished by high softening temperatures and favourable elasticity values and are used as high temperature-resistant coatings, for example in the field of electrical insulating lacquers.

It has now been found that polyamide imides which are obtained by the condensation of organic polyisocyanates, such as aliphatic, aliphatic-aromatic and aromatic diisocyanates, with cyclic polycarboxylic acid anhydrides and lactams or polyamides at temperatures of from 0° to 400° C., optionally in a solvent, are thermoplasts having excellent properties providing these polymers additionally contain from 0.1 to 20%, by weight, preferably from 0,2 to 15%, by weight, most preferably from 1 to 10% by weight corresponding to the following general formula:

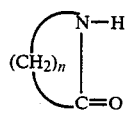

wherein n is the number 4, 5, 6, 7, 8, 9, 10, 11, 12, 13, 14, 15, 16, 17 or 18.

n denotes preferred in formula (1) the numbers n=5 (caprolactam), n=11 (azacyclotridecan-2-on laurinlactame), n=10 and n=12, mostly preferred the number n=10 and n=11 or mixtures thereof, especially preferred are all mixtures mentioned before admixed with caprolactame.

Caprolactam and azacyclotridecan-2-one (n=11), preferably in admixture, are preferred.

It has also been found that these polyamide imides may be produced, for example, in solvents and subsequently concentrated, optionally in vacuo, in an evaporation extruder at temperatures of from 250° to 400° C.

The reaction products are distinguished by favourable mechanical properties, such as impact strength, tensile strength, moduli of elasticity and dimensional stability under heat. It is surprising that the polyamide imides according to the present invention may be processed at the high temperatures which are required for the extrusion and injection-moulding of polyimides.

In general, it is only possible to use residues of very high thermal stability, for example 4,4'-substituted diphenyl esters, as the amino component in imides for applications of the type in question. It is also surprising that the polymers according to the present invention do not become brittle and infusible under these conditions, particularly during concentration in the extruder, as is the case with reaction products of polyisocyanates and cyclic polycarboxylic acid anhydrides.

According to the present invention, it is possible with advantage to use polyisocyanates of the type described, for example, in DE-OS No. 17 70 202.

Particular preference is attributed to phosgenated condensates of aniline and formaldehyde having a polyphenylene-methylene structure, technical mixtures of tolylene diisocyanates, m-phenylene diisocyanate and the symmetrical compounds 4,4'-diisocyanatodiphenyl methane, 4,4'-diisocyanatodiphenyl ether, naphthylene-(1,5)-diisocyanate, p-phenylene diisocyanate, 4,4'-diisocyanatodiphenyl methane, analogous hydroaromatic diisocyanates, such as 4,4'-diisocyanatodicyclohexyl methane, and also aliphatic diisocyanates containing from 2 to 12 carbon atoms, such as hexamethylene diisocyanate, diisocyanates derived from isophorone and mixtures thereof.

Instead of using the isocyanates, it is also possible to use compounds which react as isocyanates under the reaction conditions, preferably the addition compounds with phenols and lactams, for example phenol, technical cresol mixtures and caprolactam or mixtures of the amines corresponding to the isocyanates and aliphatic and aromatic carbonic acid esters, for example carbonic acid diethyl ester, carbonic acid diphenyl ester and ethylene carbonate, which may have been partially reacted, or even polycarbodiimides and isocyanato-isocyanurates of the described polyisocyanates. Monofunctional isocyanates, such as phenyl isocyanate, tolyl isocyanate, cyclohexyl isocyanate, stearyl isocyanate, ω,ω,ω-trifluoroethyl isocyanate and 3,5-trifluoromethyl phenyl isocyanate, or the corresponding amines, may also be used for regulating molecular weight.

The cyclic polycarboxylic acid anhydrides used in accordance with the present invention may be compounds of the type described in DE-OS No. 17 02 02 and DE-OS No. 25 42 706, preferably polycarboxylic acid anhydrides corresponding to the following general formula:

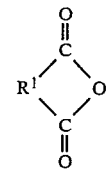

wherein $R^1$ represents an optionally substituted $C_2$–$C_{20}$ aliphatic radical, a $C_5$–$C_{10}$ cycloaliphatic radical, an aliphatic-aromatic radical containing from 1 to 10 carbon atoms in the aliphatic portion and from 6 to 10 carbon atoms in the aromatic portion or an aromatic radical containing from 6 to 10 carbon atoms which, in addition to the cyclic anhyride group, also contains at least one other cyclic anhydride group or a carboxyl group.

Butane tetracarboxylic acid dianhydride, cyclopentane tetracarboxylic acid dianhydride, pyromellitic acid dianhydride, benzophenone tetracarboxylic acid dianhydride and especially trimellitic acid anhydride are mentioned as examples.

Instead of using the carboxylic acid anhydrides, it is also possible to use derivatives, such as alkyl esters or phenyl esters or the polycarboxylic acid themselves which are converted into the acid anhyrides during the reaction.

Carboxylic acid which react monofunctionally under the reaction conditions, such as phthalic acid or its anhydride, benzoic acid or palmitic acid, which in addition may be substituted by alkyl or halogen, such as fluorine or chlorine, are used for regulating molecular weight.

Lactams suitable for use in accordance with the present invention, are for example, those corresponding to the following general formula:

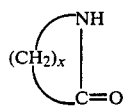 (III)

wherein

X represents an integer of from 2 to 20.

Caprolactam is preferably used.

The lactams may be replaced by or used in combination with polyamides of the type described in DE-AS No. 19 56 512, for example polycarpoic amide (nylon-6), polydodecanoic acid amide and polyamides of dicarboxylic acids, such as adipic acid, sebacic acid, oxalic acid, dibutyl malonic acid, isophthalic acid and terephthalic acid, and diamines, such as ethylene diamine, hexamethyl diamine, decamethylene diamines and m- and p-phenylene diamine. Polycaproic amide (nylon-6) and polyhexamethylene adipamide (nylon-6,6) are preferably used.

The lactams which the polyamide imides according to the present invention are intended to contain either individually or in admixture in quantities of from 0.2 to 15%, by weight, correspond to the following general formula:

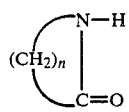 (I)

wherein n represents an integer of from 4 to 18.

It is preferred to use caprolactam and lauric lactam (azacyclotridecan-2-one), preferably in admixture.

The production of the polymers according to the present invention may be carried out in solvents, as described in DE-AS No. 17 70 202. The solvents preferably used are phenols, such as phenol, and technical mixtures of o-, m- and p-cresols.

To produce the imide thermoplasts according to the present invention, the reaction components are maintained at from 0° to 400° C. for from a few minutes to several hours in the presence or absence of solvent. The course of the reaction may be followed, for example, from the evolution of gas, from the increase in viscosity and from the IR-spectra.

The lactam used in the production of the polyamide imide may be the same lactam which the end product is intended to contain. In that case, it is possible, instead of additionally adding the same lactam, to carry our production and concentration in such a way that the quantity required in accordance with the present invention remains present in the reaction product, for example by suitably selecting the quantity of lactam, the reaction times, temperatures and the pressure at which concentration is carried out.

The additional lactams according to the present invention ($n \geq 4$) may be added either at the beginning of or during the reaction. In this connection, it is important to bear in mind that the additional lactams may have to be used in an excess relative to the required final content because partial incorporation into the polymer may occur.

In one preferred embodiment which avoids these difficulties, the lactams are only added on completion of condensation or, more preferably, in the phase preceding concentration and post-condensation in the extruder.

It is occasionally advantageous to carry out the production reaction in several stages or to add the individual components in a different sequence or at different temperatures. Thus, the polymer may be prepared in a phenolic solvent, subesequently precipitated from the solution using a non-solvent, such as methanol, and optionally post-condensed in an extruder. In one preferred embodiment, the polymer is prepared in a solvent, optionally concentrated in the reaction vessel itself to form a still-fluid solution or a casting resin, the lactam wherein $n \geq 4$ is introduced and the rest of the concentration process is carried out, optionally with post-condensation, in an evaporation extruder, optionally in vacuo, at temperatures of from 240° to 400° C., preferably from 280° to 340° C.

In a special embodiment of the invention for example during the production of the polymer in a phenolic solvent (e.g. phenol/technical cresole-mixture) after the polymerisation the reaction mixture is kept for additional 0,5 to 10 hours, preferably 1 to 6 hours at a temperature of 200° to 250° C., preferably 210° to 220° C.

These temperatures can be reached by a partial evaporation of the solvent or by applying a pressure up to about 5 bars.

In general, 1 val of carboxylic acid or cyclic carboxylic acid anhydride is reacted per val of isocyanate and from 0.5 to 2 val of lactam or amide per val of carboxylic acid anhydride, although significant deviations from these quantities are also possible. In addition to this quantity of lactam or amide, from 0.2 to 15%, by weight, preferably from 1 to 8%, by weight, of lactam wherein $n \geq 4$ is used in the manner described. In another possible embodiment, excess isocyanate is reacted with di- or tri-carboxylic acids, such as adipic acid, terephthalic acid, isophthalic acid or trimesic acid, and excess carboxylic acid with polyfunctional alcohols, such as ethylene glycol, neopentyl glycol, hexane diol, trimethylol propane, tris-hydroxyethyl isocyanurate, tris-hydroxyethyl urazole and polyesters containing terminal hydroxy groups.

The production of the polymers according to the present invention may be influenced by catalysts, for example by amines, such as triethylamine, 1,4-diazabicyclo(2,2,2)-octane, N-ethyl morpholine, N-methyl imidazole and 2-methyl imidazole, by inorganic and organic metal compounds, especially compounds of iron, lead, zinc, tin, copper, cobalt and titanium such as iron-(III) chloride, cobalt acetate, lead oxide, lead acetate, tin octoate, dibutyl tin dilaurate, copper acetylacetonate, titanium tetrabutylate, alkali metal phenolates and sodium cyanide, and by phosphorus compounds, such as trialkyl phosphine and methyl phospholine oxide.

The polyamide imides according to the present invention are distinguished by the particular tensile strength, moduli of elasticity and dimensional stability under heat thereof. The properties thereof may be varied to suit the various applications by altering the stoichiometric ratios, the degree of condensation and by the addition of low molecular weight and high molecular weight components, such as fillers, pigments, anti-agers, lubricants, plasticizers and other polymers.

EXAMPLE 1

565 g of caprolactam, 87 g of a technical mixture of 80 parts of 2,4- and 20 parts of 2,6-tolylene diisocyanate, 1125 g of 4,4'-diisocyanatodiphenyl methane and 960 g of trimellitic acid anhydride are stirred in 1875 g of a phenol/cresol (1:1) mixture first for 2 hours at 170° C. then for 2 hours at 190° C. and finally for 4 hours at 205° C. 1300 g of the solvent mixture are then distilled off in vacuo and the residue stirred for 1 hour at 210° C. The polyamide imide is obtained in the form of an approximately 80% melt. The viscosity $\eta^{25}$, as measured using a 15% solution in cresol, amounts to 670 mPas.

69 g of dodecane lactam are stirred into the melt. A brittle resin is obtained on cooling which, after size reduction, is concentrated and condensed to completion in a Welding evaporation extruder at a maximum barrel temperature of 300° C. and under a pressure of 135 mbar. The condensation product is a light brown, transparent resin having a relative viscosity $\eta$, as measured using a 1% solution in cresol at 25° C., of 2.10.

The thus-produced polymer is injection-moulded at temperatures of the order of 300° C. Test specimens having a notched impact strength of 8 kJ/m², a tensile strength of 116 mPa, a modulus of elasticity in tension of 3510 MPa and a Vicat softening temperature of 176° C. are obtained.

EXAMPLE 2

5000 g of an 80% polyamide imide resin produced in accordance with Example 1 are melted and 240 g of 12-dodecane lactam are added to the resulting melt. The homogenized melt is concentrated in a Welding evaporation extruder at a maximum barrel temperature of 310° C. and under a pressure of 165 mbar. A transparent, brown resin is obtained, its relative viscosity $\eta$ amounting to 1.86, as measured using a 1% solution in cresol at 25° C.

Injection moulding at temperatures of about 300° C. produced test specimens having an impact strength of 82 kJ/m², a tensile strength of 105 MPa, modulus of elasticity in tension of 3480 MPa and a Vicat softening temperature of 174° C.

EXAMPLE 3

5000 g of an 80% polyamide imide resin produced in accordance with Example 1 are melted and 80 g of dodecane lactam and 40 g of a technical mixture of nonyl phenols added to the resulting melt. The melt solidifies on cooling to form a brittle resin which is size reduced and concentrated in a Welding evaporation extruder at a maximum barrel temperature of 310° C. and under a pressure of 90 mbar. The imide polymer is obtained in the form of a transparent, elastic resin having a relative viscosity $\eta$ of 2.40.

EXAMPLE 4

113 g of caprolactam, 200 g of 4,4'-diisocyanatodiphenyl methane, 52.5 g of trimellitic acid anhydride and 52.5 g of bis-[4-isocyanatocyclohexyl]-methane are introduced into 640 g of phenol/cresol (1:1). The reaction mixture is stirred for 2 hours at 170° C., for 2 hours at 190° C. and for 4 hours under gentle reflux at about 200° C. 520 g of the solvent mixture are then distilled off in vacuo. The residue is then post-condensed for 1 hour at 215° C., giving an approximately 80% melt of the polyamide imide resin. The visocosity $\eta^{25}$ of a 15% solution in cresol amounts to 720 mPas. 15 g of 12-dodecane lactam are stirred into the melt. A sample of the thus-produced polymer is evaporated in a stream of nitrogen at from 250° to 300° C., giving a transparent, fusible resin having a relative viscosity $\eta$ of 1.73, as measured using a 1% solution in cresol at 25° C.

EXAMPLE 5

33.9 g of nylon-6,6 (polyhexamethylene adipamide) are dissolved in 210 g of a technical cresol mixture. 112.5 g of 4,4'-diisocyanatodiphenyl methane, 8.7 g of 2,4-tolylene diisocyanate and 96 g of trimellitic acid anhydride are then introduced and the reaction mixture is stirred for 2 hours at 170° C., for 2 hours at 190° C. and for 4 hours at 205° C. 140 g of the solvent mixture are then distilled off in vacuo, followed by stirring for 1 hour at 215° C. for further condensation. A light brown, clear melt of the polyamide imide resin having a solids content of approximately 75%, by weight, is obtained. A 15% solution in cresol has a viscosity $\eta^{25}$ of 580 mPas. 3.8 g of $\omega$-dodecane lactam are introduced into 100 g of the resulting melt. Concentration in a stream of nitrogen at from 250° to 300° C. produces a transparent, fusible resin having a relative viscosity $\eta$ of 1.82.

EXAMPLE 6

904 g of caprolactam are introduced into 3000 g of phenol/cresol (1:1) at room temperature, followed by the introduction at 120° C. of 1780 g of 4,4'-diisocyanatodiphenyl methane, 139 g of a technical mixture of 80% of 2,4- and 20% of 2,6-tolylene diisocyanate, 19 g of phenyl isocyanate and 1536 g of trimellitic acid anhydride. After stirring for 2 hours at 170° C., for 2 hours at 190° C. and for 4 hours at 205° C., 1780 g of the solvent mixture are distilled off in vacuo and the residue maintained at 215° C. for 1 hour. 110 g of 12-dodecane lactam are then introduced. A clear, brittle resin having a solids content of approximately 75%, by weight, is obtained on cooling. A 15% solution in cresol has a viscosity $\eta^{25}$ of 570 mPas.

The imide resin is concentrated in a ZSK screw extruder at a maximum barrel temperature of 320° C. and under a pressure of 400 mbar. A clear, elastic polymer is obtained, having a relative viscosity $\eta$ of 2.16, as measured using a 1% solution in cresol at 25° C.

We claim:

1. Polyamide imide polymers obtained from condensation of (1) polyisocyanates, (2) cyclic polycarboxylic acid anhydrides and (3) a member selected from lactams, polyamides, or a mixture thereof characterized in that the polymers contain from 0.1 to 20%, by weight, of a lactam of the formula

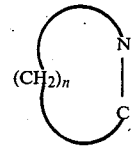

wherein n is the number 4, 5, 6, 7, 8, 9, 10, 11, 12, 13, 14, 15, 16, 17 or 18.

2. A process for producing the polymers claimed in claim 1, characterized in that, in a first stage, the polymer is prepared in a solvent by a known method and then concentrated and condensed to completion in an evaporation extruder at temperatures of from 240° to 400° C.

3. A process for producing the polymers claimed in claim 1, characterised in that during the production of the polymer in a phenolic solvent after the polymerisation the reaction mixture is kept for additional 0.5 to 10 hours at a temperature of 200° to 250° C.

4. Polymers as claimed in claim 1, characterized in that trimellitic acid anhydride is used as the polycarboxylic acid anhydride.

5. A process according to claim 2 wherein concentration and condensation to completion is under reduced pressure.

* * * * *